Patented Dec. 3, 1940

2,223,520

UNITED STATES PATENT OFFICE 2,223,520

PREPARING FERMENTABLE MASHES

John P. Ioannu, Philadelphia, Pa.

No Drawing. Application June 21, 1938,
Serial No. 214,939

11 Claims. (Cl. 195—24)

My invention relates to the processing of natural polysaccharides to produce soluble, fermentable lower saccharides.

In the industrial conversion of polysaccharides to soluble and fermentable lower sugars, the prevailing processes comprise the treatment of the raw polysaccharide in aqueous phase with heat at the proper hydrogen ion concentration until gelatinization. The water-gel is then transformed to degraded oligosaccharides by an acid-water treatment, generally at above atmospheric pressure and/or by a biological treatment with solubilizing preparations such as the enzymes of germinated grains or of certain fungi and yeasts. In the acid conversion in order to insure high yields, a prolonged heating, frequently at above atmospheric pressures, is necessary, and this offers the disadvantage of increasing the non-fermentable extractives and of affecting unfavorably the color of the product. The term "oligosaccharides" as used throughout the specification means lower fermentable sugars.

It is an object of the present invention to overcome the use of high temperatures and long periods of heating by the addition of certain chemical substances favorably affecting the production of oligosaccharides. The conversion of polysaccharides with biological preparations, such as the malt enzymes, is carried out in aqueous acid suspension, and the resulting wort is generally less concentrated because of the amounts of enzymic preparations added. Frequently better yields are possible by heating after the previous action of the enzymes.

Another object of my invention is to curtail the amounts of malt enzymes commonly used without affecting the yield.

Another object of my invention is to insure the purity of the produced oligosaccharides by operating with shorter periods of heating and thus preventing the extraction of undesirable fatty substances from the malt and grains.

Another object is to promote the production of mash worts of higher concentration and lower viscosity.

A still further object of my inventiton is to improve the yields of the industrial processes based on fungic and similar biological agents by a chemical treatment of the raw polysaccharides.

A further object of my invention is to provide a process of treatment which insures the production of oligosaccharides of lighter color. The process of the present invention generally is characterized by the addition to the natural polysaccharides commonly used as raw materials in the fermentation industries of small amounts of oxidizing substances in the presence of water and preferably heat and under selective alkaline, neutral or acidic conditions. It was found by adding suitable amounts of an oxidizing agent or of a mixture of oxidizing agents to natural polysaccharides in the presence of water and under favorable conditions of temperature and hydrogen ion concentrations that it is possible to produce fermentable lower sugars of the types and compositions generally required by the various fermentation industries with a speed of conversion and a yield to extractables above the limits now prevailing. This treatment with oxidizing agents was found to be applicable and beneficial to all kinds of natural polysaccharides, such as those of cereal grains, of tubers, of vegetable roots, of amylaceous fruits and the like. It also can be applied advantageously to the special commercial products extracted from natural polysaccharides and also to partially modified products commonly used by the fermentation industries. The enzymes commonly used by the fermentation industries are those obtained from various kinds of malted grains, i. e. barley, rye, wheat, and also from fungus cultures and yeast extracts. These sources of enzymes are known to apport to the fermentation processes three types of enzymes distinguished by their amylolytic, saccharogenic and proteolytic actions.

In carrying out my invention, the raw polysaccharides or a mixture thereof are mashed with water under agitation, the hydrogen ion concentration adjusted by known means, according to the exigencies of the polysaccharides used, and the temperature maintained at levels that insure the fluidity of the suspension. To this mash is added a small amount of oxidizing agent, and depending upon the type of oxidants used and the type of polysaccharides under process and also the conditions of treatment, the amount of the oxidizing agent may be varied and generally is found to be less than fifteen per cent of the weight of the dry raw polysaccharides of the mash. After the addition of the oxidants, the temperature is progressively increased and finally brought up to the boiling point. Eventually the heating may be continued even at above atmospheric pressure and for a time sufficient for the production of fermentable oligosaccharides of the desired composition.

The oxidizing agents applicable to this invention are compounds containing and able to liberate oxygen and/or those compounds able to exert an oxidizing action by direct or indirect liberation of oxygen. Representative examples of such oxidizing agents are: the peroxides of the alkali metals, alkaline earth metals and metal elements; the soluble salts of the group of perchloric, percarbonic, perboric, perphosphoric, persulfuric, and persilicic acids; hydrogen peroxide and its derivatives and addition products with inorganic salts or with organic compounds such as urea; the organic peroxides such as benzoyl peroxide, lauryl peroxide, succinyl peroxides and the like; the organic peracids of the general formula R—CO—O—OH and preferably the polybasic organic peracids; certain inorganic peroxy salts, such as the bromates, iodates and the like. All of the above compounds are designated under the general term "oxidizing peroxy-compounds" and are suitable for carrying out my invention. All organic compounds capable of liberating active oxygen such as the aldehyde peroxides are equivalents and are included in the general term "oxidizing peroxycompounds". Selectively those compounds are preferred that do not contain molecular groups or ions which are unfavorable or toxic to the biological processes of fermentation. The selection of a suitable oxidizing compound or a mixture thereof is predetermined by the peculiarities of the various fermentation processes. Thus, as an example, in certain brewing processes the presence of calcium ions is not desirable and in certain others and in the alcoholic fermentation worts the presence of sulfates is encouraged and the use e. g. of ammonium persulfate alone or together with hydrogen peroxide is, therefore, advisable.

The selection of the proper oxidant for each given process can be made easily by those skilled in the art of preparing fermentable lower sugars as the ions and molecular groups which are favorable, indifferent or noxious to the industrial objectives are well known.

Closely related to the peroxycompounds are the hypohalogenites and the organic compounds capable of exerting similar to the hypohalogenites oxidizing acts, e. g. the chlorinated organic compounds known as chloramines. Such compounds were found also valuable for the industrial production of oligosaccharides, as is disclosed in my copending application filed June 21, 1938, Serial No. 214,940.

The amounts of peroxycompounds to be used is predetermined by the nature of the raw polysaccharides used and by the type and composition of fermentable lower sugars desired and generally may vary from a few tenths of one per cent up to approximately ten per cent of available oxygen per one hundred parts of dry polysaccharide or a mixture thereof. The amount and composition of the fermentable oligosaccharides formed can be regulated easily by the proper variation of temperature, duration of treatment, hydrogen ion concentration and the amount of peroxycompound added. For a set of predetermined conditions prevailing in a given industrial process, the optimum amount of the selected oxidizing agent may be determined by following the formation of oligosaccharides with known chemical and physical tests, such as with iodine, with direct determination of the reducing sugars formed, viscosity tests, biological tests and the like.

Generally the hydrogen ion concentration of the mash is adjusted to the acid side or near the neutral point and seldom to a weak alkaline reaction. After cooking, the pH is finally readjusted according to the specific needs of the oligosaccharides using industries. For biological fermentative processes, the pH is generally adjusted on the acid side, while for certain other industries, such as the dextrose manufacture, the pH is adjusted on the neutral or the alkaline side.

An example illustrating the application of the present invention to the brewing industry may be carried out with a cooker mash. Frequently in this industry a portion of the brewed malted grain is replaced with amylaceous substances, e. g. corn or rice derivatives and the like. Such a procedure is known to be advantageous and particularly useful with malts of high protein content. When a raw grain is used together with malted grain, generally one cooker mash and at least one pure malt mash are prepared. When in brewing, malt and rice is used, the rice being mashed separately with an equal amount of malt and cooked generally under pressure. This besides destroying the activity of the portion of malt added to the cooker frequently extracts from the malt grain, oils and other substances which unfavorably affect the biological processes and the quality of the beer. By my process the amount of malt added to the cooker with the rice is lowered by about twenty-five per cent and may be eliminated completely, if desired. To the cooker is added 3.50 parts of thirty per cent hydrogen peroxide for each one hundred parts of dry rice and the cooking continued under pressure in an open or closed cooker for a period of time generally shorter by twenty per cent, or until the desirable amount of fermentable sugars is formed.

The enzymes commonly used by the fermentation industries in the processing of raw materials are known to be mainly three, as distinguished by their proteolytic, amylolytic and saccharogenic actions. The prevailing practice is to use the enzyme complexes as found in the various malted grains, such as barley, rye, wheat, and the like, and those found in fungus cultures or yeast extracts. All the above-mentioned enzymes are included in the term "enzyme preparations" used in the specification and claims.

An alternative way of carrying out my invention consists in adding 2.50 parts of thirty per cent hydrogen peroxide together with 1.50 parts of ninety-eight per cent ammonium persulfate for each one hundred parts of dry rice. These additions are made during mashing with water, and the heating in the cooker is continued until a satisfactory amount of the desired fermentable oligosaccharides is formed. The special cooked mash thus prepared is added to the malted grain mash and the whole maintained for a period of time at the saccharification temperature. By the use of the cooker mash of raw grains of my invention, the saccharification rest period may be shortened by approximately ten per cent and the total yields in extractables increased by about five per cent.

The various natural polysaccharides used by the industries are known to present specific resistances to enzymatic solubilization, and when malted grain is used to convert other than its own polysaccharides, certain difficulties appear which are overcome by the process herewith disclosed. By leveling the polysaccharide resistance to conversion, my process renders possible a more efficient flow schedule in the plant and an increased production from existing installations.

An alternative method of application is the addition of the peroxycompound or a mixture thereof in the form of a powder or of a solution to the dry comminuted raw polysaccharides before mashing. Another alternative method of application is the addition of the peroxycompounds to a cold mash before the time of actual mashing and cooking. Still another alternative method of application is the addition of the predetermined amount of peroxycompounds in the cooking vessel in two or more portions during the mashing.

Since the hereinabove disclosed process is adaptable to certain changes as predetermined by the raw materials used and the physical and chemical conditions prevailing during conversion and by the type and composition of fermentable lower sugars desired by the various fermentation industries, and since the process can be carried out by several alternative methods of application, obviously all these changes and such others as are self-suggesting to those familiar with the art of converting polysaccharides may be made without departing from the scope of my invention. As considerable modification is possible in the steps employed in adding the oxidizing agents to the polysaccharides under process as well as in the type and amounts of peroxycompounds used, it is intended that all matter of the above description shall be interpreted as illustrative of applications of the process disclosed.

I claim:

1. In the mashing and processing of raw grains commonly used by the fermentation industries for preparing worts containing lower fermentable sugars and other extractives derived from the raw grains used, said worts being suitable for sustaining and furthering the biological processes prevailing in said fermentation industries, the steps comprising adding to said mashes composed mainly of a combination of natural raw grains, a plurality of added malt enzymes and water, small amounts of peroxycompounds, and said addition being made during said mashing and wort-forming operations of the fermentation industries.

2. In the mashing and processing of raw grains commonly used by the fermentation industries for preparing worts containing fermentable lower saccharides and other extractives derived from the raw grains used, said wort being suitable for maintaining and furthering the biological processes prevailing in said fermentation industries, the steps comprising adding to said mashes, composed mainly of a combination of raw cereal grains, a plurality of added malt enzymes and water, small amounts of peroxycompounds, said addition being made to mashes processed at temperatures below 100° C., and subsequently further processed by additional amounts of enzyme preparations derived from malted grains to produce a wort suitable for the fermentation industries.

3. In the mashing and processing of raw grains commonly used by the fermentation industries for preparing worts containing lower fermentable saccharides and other extractives derived from the raw grains used, said wort being suitable for maintaining and furthering the biological processes prevailing in said fermentation industries, the steps comprising adding to said mashes composed mainly of a combination of raw cereal grains, a plurality of added malt enzymes and water, small amounts of peroxycompounds, said addition being made to mashes processed under pressure at temperatures above 100° C., and subsequently further processed by additional amounts of enzyme preparations derived from malted grains to produce a fermentable wort suitable for the fermentation industries.

4. In the mashing and processing of raw grains commonly used by the fermentation industries for preparing worts containing fermentable lower saccharides and other extractives derived from the raw grains used, said worts being suitable for maintaining and furthering the biological processes prevailing in said fermentation industries, the steps comprising adding to said mashes composed mainly of a combination of raw cereal grains, a plurality of added malt enzymes and water and having a light acidity indicated by a pH not below 4, small amounts of peroxycompounds, and said addition being made during said mashing and wort-forming operations of the fermentation industries.

5. In the mashing and processing of raw grains commonly used by the fermentation industries for preparing worts containing fermentable lower saccharides and other extractives derived from the grains used, said worts being suitable for maintaining and furthering the biological processes prevailing in said fermentation industries, the steps comprising adding to a mash prepared with a combination of raw grains, a plurality of added malt enzymes and water and having a light acidity as indicated by a pH not below 4 and processed with heat until a sufficient opening of the raw materials used, small amounts of hydrogen peroxide, and then continuing the processing until a sufficient fluid mash is obtained, then cooling and treating with additional amounts of enzymes derived from malted grains and continuing the mashing until a wort is obtained containing not less than 70 per cent of the total amount of fermentable extractives possible to be obtained from the raw materials used in said mash.

6. In the mashing and processing of raw grains commonly used by the fermentation industries for preparing worts containing fermentable lower saccharides and other extractives derived from the grains used, said worts being suitable for maintaining and furthering the biological processes prevailing in said fermentation industries, the steps comprising adding to a mash prepared with a combination of raw grains a plurality of added malt enzymes and water having a light acidity as indicated by a pH not below 4, and processed with heat until partial fluidity, small amounts of hydrogen peroxide and ammonium persulfate and continuing the processing and heating until a sufficient fluid mash is obtained, then cooling and treating with additional amounts of enzymes derived from malted grains and continuing the mashing until a wort is obtained containing not less than 70 per cent of the total amount of fermentable extractives possible to be obtained from the totality of raw materials used in said mash.

7. In the mashing and processing of raw grains commonly used by the fermentation industries for preparing worts containing fermentable lower saccharides and other extractives derived from the grains used, said worts being suitable for maintaining and furthering the biological processes prevailing in said fermentation industries, the steps comprising adding to a mash prepared with a combination of raw grains, a plurality of added malt enzymes and water and having a light acidity as indicated by a pH not below 4, and processed with heat until partial fluidity, small amounts of hydrogen peroxide and a soluble bromate and continuing the processing and heating until a sufficient fluid mash is obtained, then cooling and treating with additional amounts of enzyme preparations and continuing the mashing until a wort is obtained containing not less than 70 per cent of the total amount of fermentable extractives possible to be obtained from the totality of raw materials used in said mash.

8. In the processing of raw grains commonly used by the fermentation industries for preparing worts containing fermentable lower saccharides and other extractives derived from the grains used, said worts being suitable for maintaining and furthering the biological processes prevailing in said fermentation industries, the steps comprising adding to a mash prepared with a combination of raw grains, a plurality of added malt enzymes and water and having a light acidity as indicated by a pH not below 4, and processed with heat until partial fluidity, small amounts of ammonium persulfate and small amounts of potassium bromate and continuing the processing and heating until a sufficient fluid mash is obtained, then cooling and treating with additional amounts of enzymes derived from malted grains or fungi cultures and continuing the mashing until a wort is obtained containing not less than 70 per cent of the total amount of fermentable extractives possible to be obtained from the totality of raw materials used in said mash.

9. A process for mashing and processing raw grains commonly used by the fermentation industries for preparing worts containing fermentable lower saccharides and other extractives derived from the raw grains used, said wort being suitable for maintaining and furthering the biological processes prevailing in said fermentation industries, the steps comprising adding to said mashes composed mainly of a combination of raw grains, a plurality of added malt enzymes and water, small amounts of peroxycompounds, said peroxycompounds being added in a plurality of steps during said mashing and wort-forming operations prevailing in the fermentation industries.

10. The improvement in the art of mashing raw grains commonly used by the fermentation industries for preparing worts containing lower fermentable saccharides and other extractives derived from the raw grains used, said worts being suitable for maintaining and furthering the biological processes prevailing in said fermentation industries, consisting in the steps of preparing a mash with a combination of milled raw cereal grains, a plurality of added malt enzymes and water and having a light acidity as indicated by a pH not below 4, processing said mash with heat until the opening of the grains, then adding small amounts of peroxycompounds and continuing the processing and heating until a sufficient fluid mash is obtained, then cooling and treating with additional amounts of enzymes derived from malted grains and continuing the mashing until a wort is obtained containing not less than 70 per cent of the total amount of fermentable extractives possible to be obtained from the totality of raw materials used in said mash.

11. The improvement in the art of mashing raw grains commonly used by the fermentation industries for preparing worts containing fermentable lower saccharides and other extractives derived from the raw grains used, said worts being suitable for maintaining and furthering the biological processes prevailing in said fermentation industries, consisting in the steps of preparing a mash with a combination of milled raw grains, a plurality of added malt enzymes and water and having a slight acidity as indicated by a pH below 4, processing said mash with heat until the opening of the grains, then adding small amounts of peroxycompounds and continuing the processing and heating until a sufficient fluid mash is obtained, then cooling and treating with additional amounts of enzyme preparations derived from malted grains and small amounts of peroxycompounds and continuing the mashing until a wort is obtained containing not less than 70 per cent of the total amount of fermentable extractives possible to be obtained from the raw materials used in said mash.

JOHN P. IOANNU.